United States Patent
Lippman et al.

(10) Patent No.: US 9,815,385 B2
(45) Date of Patent: Nov. 14, 2017

(54) VEHICLE FRONT SEAT ADJUSTMENT BASED ON ANTHROPOMETRIC CHARACTERISTICS OF A REAR PASSENGER

(71) Applicant: Ford Global Technologies, LLC, Dearborn, MI (US)

(72) Inventors: Mark Allan Lippman, New Baltimore, MI (US); Allan Roy Gale, Livonia, MI (US); Mangala A. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/671,032

(22) Filed: Mar. 27, 2015

(65) Prior Publication Data
US 2016/0280161 A1    Sep. 29, 2016

(51) Int. Cl.
*B60N 2/00* (2006.01)
*B60N 2/02* (2006.01)
*B60R 16/03* (2006.01)
*B60R 16/037* (2006.01)

(52) U.S. Cl.
CPC ........... *B60N 2/002* (2013.01); *B60N 2/0244* (2013.01); *B60R 16/037* (2013.01); *A63B 2225/096* (2013.01); *B60N 2002/0268* (2013.01); *G06T 2207/30196* (2013.01); *G06T 2207/30252* (2013.01)

(58) Field of Classification Search
CPC ............ B60R 16/037; A63B 2225/096; G06T 2207/30196; G06T 2207/30252
See application file for complete search history.

(56) References Cited

U.S. PATENT DOCUMENTS

| | | | |
|---|---|---|---|
| 2011/0010135 A1* | 1/2011 | Boin | B61D 1/04 703/1 |
| 2011/0062285 A1* | 3/2011 | Herzog | B64D 11/00 244/118.6 |
| 2012/0154587 A1* | 6/2012 | Hwang | B60R 1/00 348/148 |
| 2012/0217764 A1* | 8/2012 | Ishiguro | B60R 1/00 296/1.07 |

(Continued)

FOREIGN PATENT DOCUMENTS

| | | |
|---|---|---|
| DE | 102009040995 A1 | 4/2010 |
| DE | 102010028580 A1 | 11/2011 |
| JP | 2009-46026 A | 3/2009 |

*Primary Examiner* — Thomas Ingram
(74) *Attorney, Agent, or Firm* — Frank A. MacKenzie; Brooks Kushman P.C.

(57) ABSTRACT

A vehicle system includes a front row seat and at least one controller. The front row seat may be a driver seat or a front passenger seat. The at least one controller may respond to a signal, for example, a signal transmitted from a key fob or a signal indicative of movement of a rear door handle. In response to the signal, the controller may move the front row seat based on data indicative of a size of a rear passenger expected to be seated behind the front row seat before the expected rear passenger enters the vehicle. The size of the rear passenger may be determined via data from an external object sensor such as a blind spot detection optical sensor, lidar sensor or ultrasonic sensor.

17 Claims, 3 Drawing Sheets

(56) References Cited

U.S. PATENT DOCUMENTS

| | | | | |
|---|---|---|---|---|
| 2013/0090816 A1* | 4/2013 | Huber | ............... | B60R 16/037 |
| | | | | 701/49 |
| 2013/0218420 A1* | 8/2013 | Jendritza | ............ | B60N 2/002 |
| | | | | 701/49 |
| 2013/0329960 A1* | 12/2013 | Sandahl | .......... | G06K 9/00791 |
| | | | | 382/104 |
| 2014/0052345 A1* | 2/2014 | Tobin | ............... | B60R 16/037 |
| | | | | 701/49 |
| 2014/0379135 A1* | 12/2014 | Kristiansen | ....... | A63B 22/0046 |
| | | | | 700/275 |
| 2015/0119203 A1* | 4/2015 | Kautz | .............. | A63B 69/16 |
| | | | | 482/57 |

\* cited by examiner

VEHICLE FRONT SEAT ADJUSTMENT BASED ON ANTHROPOMETRIC CHARACTERISTICS OF A REAR PASSENGER

TECHNICAL FIELD

This application is generally related to adjusting a front seat of a vehicle based on anthropometric characteristics of a rear seat passenger.

BACKGROUND

A primary goal in the design of automotive vehicle interiors is to achieve a comfortable and safe seating position for vehicle occupants in which the occupants may have a wide range of body sizes and types. Many different types of adjustable seat mechanisms are available, and seats in which translation motion and seat back tilt is powered by electric motors are common. Also, the use of memory seat modules in which multiple preset positions are stored in memory such that a single press of a button will adjust a seat and seat back according to the preset data is common. These adjustments focus on the driver and driver preferences to set seat position such as the seat height, forward/rear position, seat bottom angle, and seat back angle. Typically, limited space is available in the passenger compartments of most vehicles, and particularly in the rear seating rows.

SUMMARY

A blind-spot detection system for a vehicle includes a side view optical sensor arrangement and at least one controller. The side view optical sensor arrangement is configured to capture data about an expected driver side rear passenger before the expected driver side rear passenger enters the vehicle. And, the at least one controller is configured to move a driver seat based on a size of the expected driver side rear passenger that is derived from the data.

A method of automatically adjusting a front seat of a vehicle includes capturing by a sensor arrangement data indicative of a size of an expected driver side rear passenger prior to the expected driver side rear passenger entering the vehicle. The method further includes moving by a controller the front seat prior to the expected driver side rear passenger entering the vehicle to a target position that is based on the size and front seat passenger data.

A vehicle includes a sensor system and at least one controller. The at least one controller is configured to respond to a trigger signal. The response of the at least one controller is to activate the sensor system to capture data indicative of a size of an expected rear passenger before the expected rear passenger enters the vehicle. And, the response of the at least one controller is to move a steering wheel or accelerator pedal of the vehicle based on the size before the expected rear passenger enters the vehicle.

DETAILED DESCRIPTION

Figure 1:
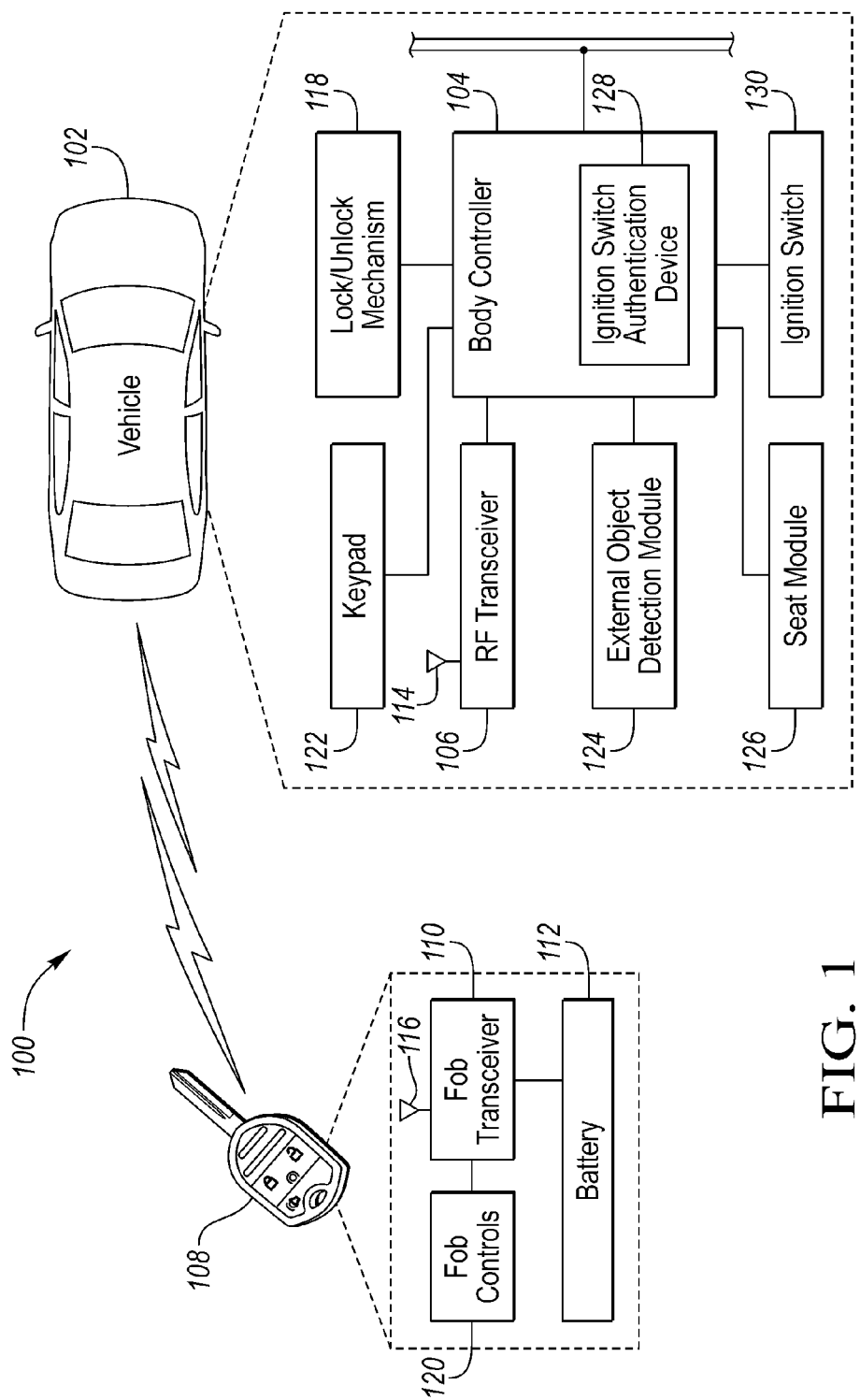
FIG. 1 illustrates an exemplary keyless entry system for a vehicle including an external object detection module and seat module.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Some vehicles include a keyless entry system, an external object detection module, and at least one seat module. The keyless entry system may include a key fob having a RF transmitter and a RF receiver mounted in the vehicle. The key fob and RF receiver are configured to communicate with each other. The communication may include a handshake and access authentication. Upon authentication, select modules in the vehicle may wake up or become activated. Here, an external object detection module (EODM) such as a pedestrian detection system, a blind spot information system, a park-assist system, a back-up assistance system, or a cross traffic alert system may be become activated in response to a signal from the key fob received by the RF receiver. Upon activation, data such as physical characteristics of an expected driver and passenger that is expected to be seated behind the driver may be gathered by the EODM.

Typically, a driver seat is adjusted solely based on either a driver's desired position or physical characteristics of the driver. Here, the driver seat position is adjusted according to the data gathered by the EODM about the driver's physical characteristics compensated by the characteristics of the passenger seated behind the driver. The driver seat adjustment is such that the driver's preference and physical characteristics are of primary concern. However, characteristics of the passenger expected to be seated directly behind the driver are used to adjust the driver seat position to a compensated position. In this application, the term driver seat includes a front seat from which a vehicle may be operated and a front row seat utilized by a passenger.

The compensated position may be determined by different strategies including feedback developed by human participant testing and cabin space calculations based on the optimal seat positions for safety and comfort. For example, human testing can include several individuals of differing physical attributes providing feedback on seat position adjustment preference when there is a passenger seated directly behind the driver. This feedback can include data such as multiple combinations of occupants having different leg and torso lengths. The data may be based on diverse occupant anthropometric characteristics in which occupants having different anthropometric characteristics are situated in both the front seat and back seat being directly behind the front seat. This information can be used to create a look-up table to determine the most likely compensated position for the data gathered by the EODM about the anthropometric characteristics of both an expected driver and an expected passenger seated behind the driver. In another example, data collected from computer models, crash testing or real world vehicle collision data can be used to create a look-up table of the position most likely to be optimal for safety and comfort.

FIG. 1 illustrates an exemplary keyless entry system 100 for a vehicle 102 including a keypad 122, a seat module 126 and an external object detection module (EODM) 124. The system 100 may include a body controller 104 having a radio frequency (RF) transceiver 106. A key fob 108 may be in communication with the RF transceiver 106 of the controller 104 utilizing a fob transceiver 110 powered by a battery 112. An antenna 114 of the RF transceiver 106 may receive RF signals from an antenna 116 of the fob transceiver 110, and may deliver the signals to the RF transceiver 106. An unlock/lock mechanism 118 is operably coupled to the controller 104. The controller 104 is configured to control the unlock/lock mechanism 118 to unlock/lock doors of the vehicle 102 in response to the RF signals transmitted by the key fob 108. Power window actuators (not shown) may also be operably coupled to the controller 104, such that the controller 104 is configured to cause the various windows (e.g., front and rear door power windows, powered window side vents, power sunroofs and moon-roofs) of the vehicle 102 to open or close. The key fob 108 may include one or more fob controls 120, such as a lock switch and an unlock switch. Accordingly, the controller 104 controls the unlock/lock mechanism 118 to lock the doors of the vehicle 102 in response to a user depressing a lock fob control 120 of the key fob 108, and to unlock the doors of the vehicle 102 in response a signal based on the user depressing an unlock fob control 120 of the key fob 108. The key fob 108 may also periodically transmit a signal that may wake up vehicle modules including the controller 104 and further be used to unlock doors or activate other modules in the vehicle.

The keypad 122 is in electrical communication with the controller 104. The keypad 122 may be positioned on an exterior portion or section of the vehicle 102. The keypad 122 may include a touchpad configured to receive user input. The keypad 122 may wake-up the controller 104 and other modules in the vehicle upon a key on the keypad being pressed.

In an example, the keypad 122 may transmit commands via hardwired signals to the controller 104 responsive to the user interacting with the keypad 122. In another example, the keypad 122 may transmit commands via RF signals to the controller 104. The controller 104 may control some vehicle features including the door unlock/lock mechanism 118, lift gate operation, engine ignition 130 and window movement mechanism. The unlock/lock mechanism 118 unlocks/locks the doors in response to receiving the commands, e.g., two or more signals (RF or hardwired) which correspond to a valid sequence of alpha, numeric, or alphanumeric characters. Activation of the ignition switch 130 may power up vehicle modules including the EODM 124 and seat modules such as a driver seat module, a passenger seat module, a heated ventilated seat module, power folding seat module or rear seat module.

The key fob 108 may be implemented in connection with a base remote entry system, a passive entry passive start (PEPS) system or a passive anti-theft system (PATS). With the PEPS system, the controller 104 may control the unlock/lock mechanism 118 to unlock the door in response to the controller 104 determining that the key fob 108 is a predetermined distance away from the vehicle 102. In such a case, the key fob 108 automatically (or passively) transmits encrypted RF signals (e.g., without user intervention) in order for the controller 104 to decrypt (or decode) the RF signals and to determine if the key fob 108 is within the predetermined distance and are authorized. It is to be noted that with the PEPS implementation, the key fob 108 also generates RF signals which correspond to encoded lock/unlock signals in response to a user depressing a lock fob control 120 or an unlock fob control 120. In addition, with the PEPS system, a key may not be needed to start the vehicle 102. The user in this case may be required to depress the brake pedal switch or perform some predetermined operation prior to depressing a start switch after the user has entered into the vehicle 102. In the PATS implementation, the key fob 108 may operate as a conventional key fob in order to unlock/lock the vehicle 102. With the PATS implementation, a key (not shown) is generally needed to start the vehicle 102. The key may include a RF transmitter embedded therein to authenticate the key to the vehicle 102.

The controller 104 includes an ignition switch authentication device 128. The ignition switch authentication device 128 may also include an RF receiver (not shown) and an antenna (not shown) for receiving RF signals transmitted by the RF transmitters of the keys. It should be noted that the ignition switch authentication device 128 may be implemented as a standalone controller (or module). The ignition switch authentication device 128 is configured to authenticate the particular type of mechanism used to start the vehicle 102. For example, with the PATS implementation, the key is inserted into an ignition switch 130 to start the vehicle 102. In such a case, the RF transmitter of the key transmits RF signals having encrypted data therein to the receiver of the ignition switch authentication device 128. The ignition switch authentication device 128 decrypts the data to authenticate the key prior to allowing the user to start the vehicle 102.

With the PEPS implementation, as noted above, a key is not needed to start the vehicle 102. In such a case, the ignition switch authentication device 128 authenticates the RF encrypted data passively transmitted by the transmitter 108a-108n to allow the user to start the engine of the vehicle 102. As noted above, in addition to the authentication device 128 authenticating the RF encrypted data, the user may perform a predetermined operation (e.g., pull handle of a door, or open door, toggle the brake pedal switch, or other operation) prior to depressing a start switch to start the vehicle 102. The system 100 contemplates a number of other operations from those listed prior to depressing the start switch to start the vehicle 102.

Figure 2:
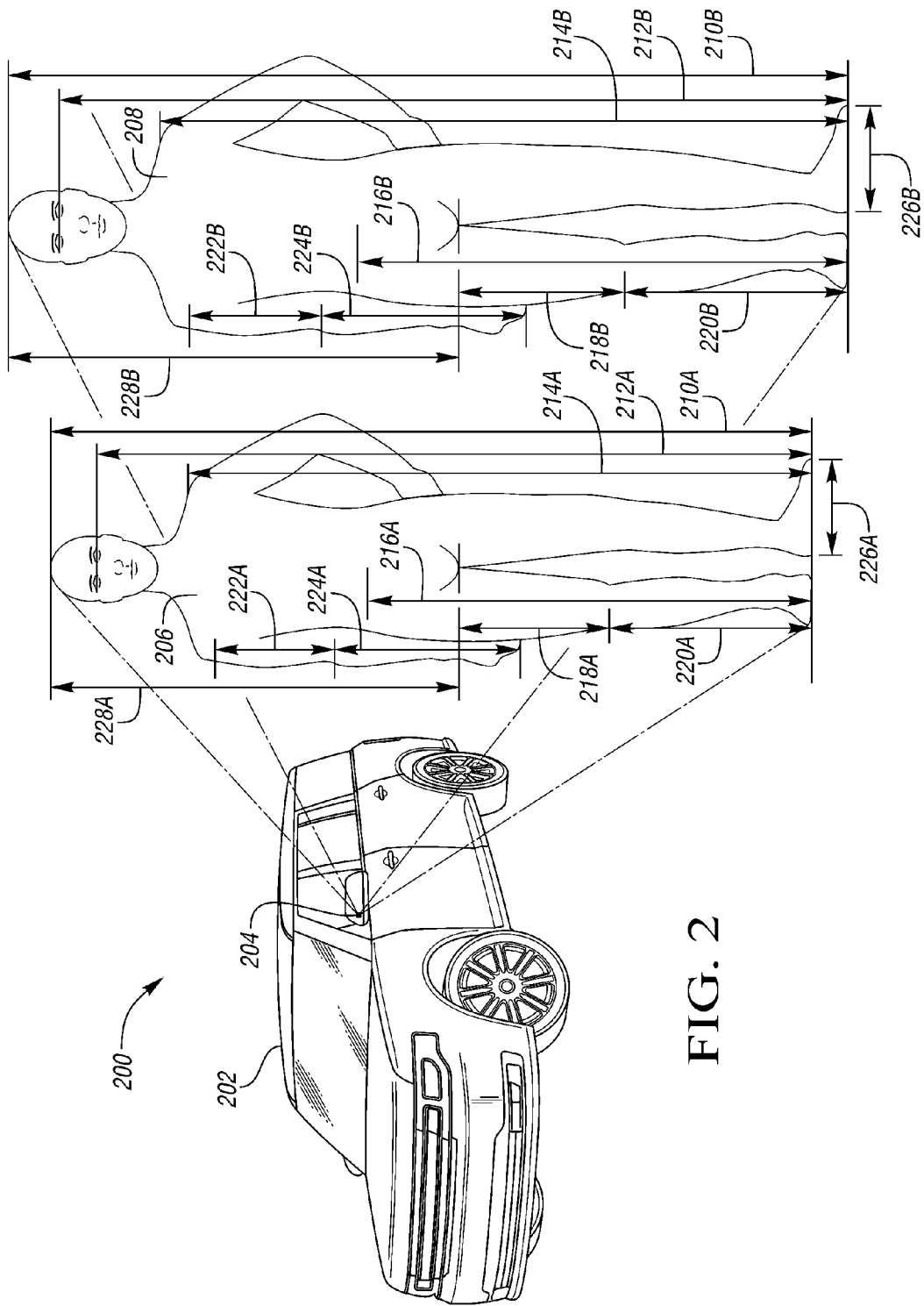
FIG. 2 is an exemplary illustration of a vehicle characterizing expected occupants by an external object detection module.

FIG. 2 is an exemplary illustration of an external object detection vehicle system 200 characterizing expected occupants 206 and 208 proximite to the vehicle 102. For example, as an expected passenger 206 approaches the vehicle 102, a signal from a key fob or a signal from a vehicle keyless entry keypad is received by a controller in the vehicle. The controller activates an EODM 124 such as a side impact detection or blind spot detection system. The EODM 124 may gather data from many different sensors including vision or optical sensors, LiDAR, RADAR, ultrasonic and electromagnetic. These sensors may be mounted facing forward, backwards, or side mounted. Systems utilizing forward facing sensors include pedestrian detection, collision detection and adaptive cruise control. Systems utilizing backward facing sensors include pedestrian detection, park assist, rear collision detection, and back-up vision. Systems utilizing side mounted sensors include pedestrian detection, blind spot detection, and cross traffic detection. In this example, the EODM 124 records physical characteristics of an expected driver 206 positioned near the driver door and an expected passenger 208 positioned near a driver side passenger door including a driver side rear passenger door. This example is for a 4-door vehicle but may be implemented in a vehicle having two doors. In a 2-door vehicle the driver seat is pivoted forward, usually manually, so a rear passenger can climb into the rear seat.

Based on data gathered by the EODM 124 while the expected occupants 206 and 208 are outside the vehicle, a controller may calculate anthropometric characteristics of the driver and passenger. Also, the controller may use data representative of average anthropometric characteristics of a rear seat passenger. Anthropometric characteristics of the driver may include driver stature 210A, driver eye height 212A, driver shoulder height 214A, driver waist height 216A, driver upper leg length 218A, driver lower leg length 220A, driver upper arm length 222A, driver lower arm and hand length 224A, driver shoe size 226A and driver sitting height 228A. Similarly, anthropometric characteristics of the passenger may include rear passenger stature 210B, rear passenger eye height 212B, rear passenger shoulder height 214B, rear passenger waist height 216B, rear passenger upper leg length 218B, rear passenger lower leg length 220B, rear passenger upper arm length 222B, rear passenger lower arm and hand length 224B, rear passenger shoe size 226B and rear passenger sitting height 228B.

Based on the data from the EODM 124, a seat module such as a driver seat module may adjust the position of the driver seat base and the angle of the driver seat back to maximize comfort for both front and rear passengers. The adjustment may include allocating greater emphasis to the driver preference and driver characteristics. However, the passenger characteristics may still influence the driver seat position and driver seat back angle. Also, other modules in the vehicle such as an automatic steering column control module, an automatic foot pedal adjustment module or a power mirror module may receive signals from the EODM 124 to adjust foot pedals, steering wheel angle, steering wheel extension, or mirror position based on characteristics of the driver 206 and passenger 208. Further, the EODM 124 may provide a count of individuals next to the vehicle 202 and in response to the number being greater than a predetermined number, active a power folding seat module to deploy a seat to accommodate a passenger.

Figure 3:
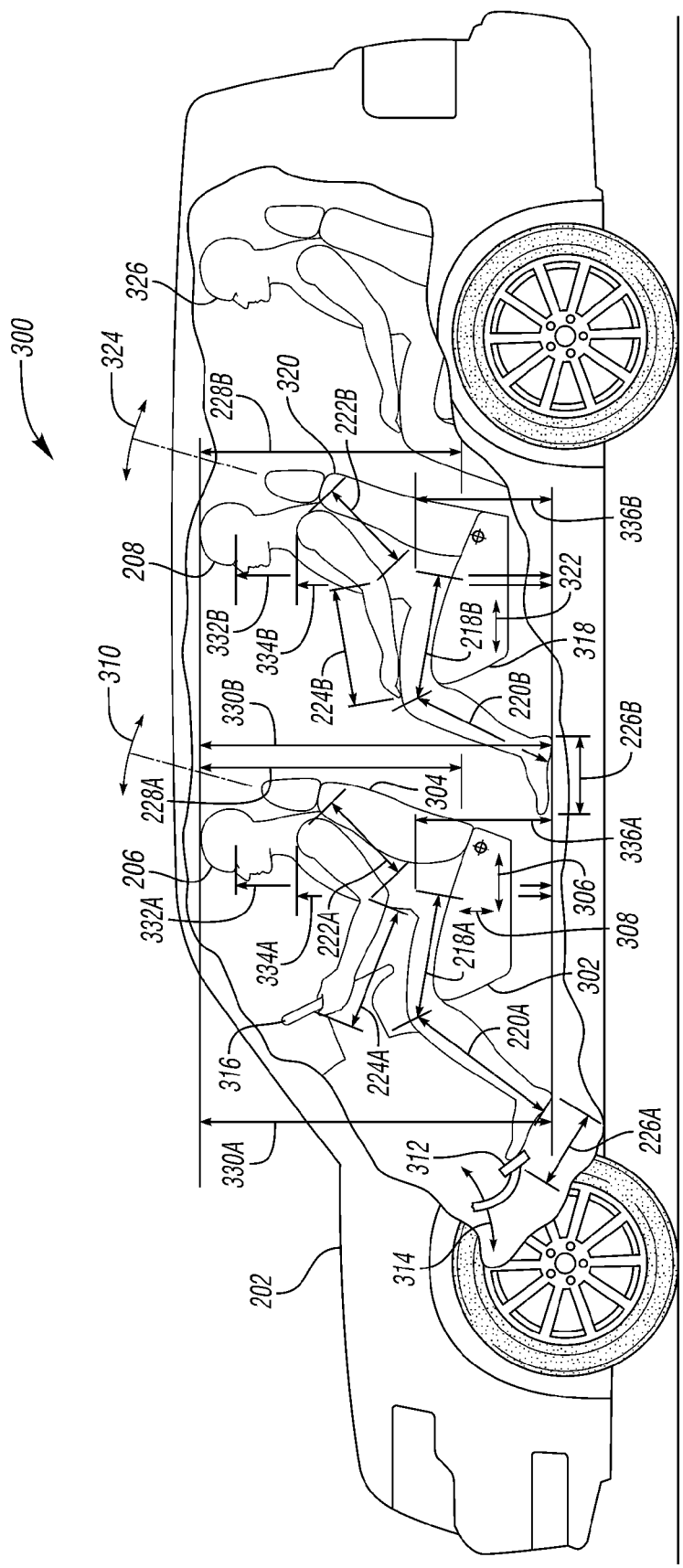
FIG. 3 is an exemplary illustration of a vehicle interior having 3 rows of seats adjusted based on expected occupants.

FIG. 3 is an exemplary illustration of an adjusted vehicle interior 300 having 3 rows of seats after adjustments based on expected occupants. For example, a driver seat base 302 and driver seat back 304 may be moved according to signals sent by the EODM 124 based on driver and passenger characteristics. In which the driver characteristics such as driver stature 210A, driver eye height 212A, driver shoulder height 214A, driver waist height 216A, driver upper leg length 218A, driver lower leg length 220A, driver upper arm length 222A, driver lower arm and hand length 224A, driver shoe size 226A and driver sitting height 228A may be used along with vehicle data to estimate driver head room height 330A, driver eye height 332A, driver shoulder height 334A, and driver seat height 336A. Similarly, passenger characteristics such as rear passenger stature 210B, rear passenger eye height 212B, rear passenger shoulder height 214B, rear passenger waist height 216B, rear passenger upper leg length 218B, rear passenger lower leg length 220B, rear passenger upper arm length 222B, rear passenger lower arm and hand length 224B, rear passenger shoe size 226B and rear passenger sitting height 228B may be used along with vehicle data to estimate passenger head room height 330B, passenger eye height 332B, passenger shoulder height 334B, and passenger seat height 336B.

The driver seat base 302 may be configured to provide translational motion 306 along a longitudinal axis of the vehicle 102 or may provide translational motion 308 along a vertical axis of the vehicle. Also, the driver seat back 304 may pivot 310 with the driver seat base 302. Based on the driver data and the passenger data, the driver seat base 302 may move both longitudinal and vertical to maximize the leg room for both driver and passenger. And, the driver seat back 304 may pivot 310 based on the driver data and the passenger data. For safety and driver comfort, the driver may be able to override the automatic seat positioning made by the controller. Safety and comfort aspects for the driver include driver head room height 330A, driver eye height 332A, driver shoulder height 334A, and driver seat height 336A. Similarly, safety and comfort aspects for the passenger include passenger head room height 330B, passenger eye height 332B, passenger shoulder height 334B, and passenger seat height 336B.

The controller may also adapt to situations including objects in a seat such as luggage or a child seat, and in such cases a driver may override all automatic seating movements.

Also, an automatic foot pedal module may adjust a position of a foot pedal assembly 312 by pivoting 314 the foot pedal assembly increasing a space for the driver 206 and passenger 208. Further, a steering column control module may automatically adjust a tilt and extension length of a steering wheel 316 increasing a space for the driver 206 and passenger 208. In another example, a $2^{nd}$ row seat base 318 configured to provide translational motion 322 along a longitudinal axis of the vehicle 102 and a $2^{nd}$ row seat back 320 configured to pivot 324 with the $2^{nd}$ row seat base may move both longitudinal and pivotal based on the characteristics of the driver 206 and the passenger 208. The motion of a $2^{nd}$ row seat may further be configured to make an accommodation for a $3^{rd}$ row passenger 326.

Also, for example, a vehicle parked in a parking lot between two vehicles may detect a driver is near and adjust the driver seat accordingly. However, a passenger near the rear door of a four door vehicle may not be detected until the passenger opens the rear door. Here, the driver seat position may be compensated in response to a signal indicative of the opening of the rear vehicle door. Further, this compensation can be based on passenger size if known or a default compensation adjustment amount determined by test results and adjusted for varying cabin space, providing a reasonable default adjustment compensation figure. Likewise, if a rear seat passenger entry cannot be verified, the rear door opening can be the trigger for a compensated seat position adjustment.

Another example is regarding a two door vehicle in which a rear seat passenger cannot be verified before a vehicle door is opened. Here, the driver seat back being released and moved forward or similar action may be used to identify rear seat entry. The driver seat back being released or similar action may be the trigger for a compensated seat position adjustment. Also, use of a passive occupant detection system (PODS) or passenger seat weight detection system may be used to generate a compensated seat position adjustment based on passenger size estimations. Further, in the case of an object such as a grocery bag, purse or briefcase being placed in a rear seat, a controller may determine that a compensated driver seat position is not required based on data from an EODM or PODS system.

The examples illustrated on the driver side of the vehicle are also applicable to a passenger side of the vehicle. Further, examples illustrated on the driver side of the vehicle are also applicable to a $2^{nd}$ row seat when a passenger is expected to be seated directly behind in a $3^{rd}$ row seat. Also, driver selection may be provided through an HMI coupled with the controller where seat position adjustment can be selectable based on optimal safety or a balance of safety and comfort. A vehicle operator may also select to disable or turn off the automatic seat adjustment system.

Key fob control may be enhanced to include a function that transmits at least one signal to the vehicle indicative of expected rear seat or third row passengers. For example, a person holding the key fob pushes the unlock button three times to indicate a third row passenger is approaching. The vehicle in response prepares the vehicle seats for third row seat entry position. The vehicle begins to observe passenger size prior to a passenger entering the vehicle, to determine appropriate seat position. In another example, an addition button is provided on a key fob that allows the key fob holder to press for unlock as traditional or to press an alternative button to indicate passengers entry. The passenger entry button can assume a single press to be 2 people in the front seat, two presses for front and back seat passengers and three presses indicative of a third row passenger. Here, the vehicle will prepare for the passengers in response to the at least one signal and record and process data to adjust for appropriate seat positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A blind-spot detection system for a vehicle comprising:
   a side view optical sensor arrangement of the blind-spot detection system configured to capture data about an expected driver side rear passenger before the expected driver side rear passenger enters the vehicle; and
   at least one controller configured to move a driver seat based on a size of the expected driver side rear passenger that is derived from the data.

2. The system of claim 1, wherein the at least one controller is further configured to activate the side view optical sensor arrangement in response to a signal from a key fob.

3. The system of claim 1, wherein the at least one controller is further configured to activate the side view optical sensor arrangement in response to movement of a rear door handle.

4. The system of claim 1, wherein moving includes pivoting a seat back of the driver seat or translating a base of the driver seat.

5. The system of claim 1, wherein the at least one controller is further configured to move the driver seat based on a size of an expected driver.

6. The system of claim 5, wherein the at least one controller further includes input channels configured to receive the data, output channels configured to provide driver seat position control commands to move the driver seat, and control logic configured to generate the driver seat position control commands based on the size of the expected rear passenger.

7. A method of automatically adjusting a front seat of a vehicle comprising:
   capturing by a blind-spot optical sensor arrangement data indicative of a size of an expected driver side rear passenger prior to the expected driver side rear passenger entering the vehicle; and
   moving by a controller the front seat prior to the expected driver side rear passenger entering the vehicle to a target position that is based on the size and front seat passenger data.

8. The method of claim 7, wherein moving the front seat includes pivoting a seat back of the front seat or translating a base of the front seat.

9. The method of claim 7, wherein the data includes measurements based on average rear seat passenger anthropometric characteristics.

10. The method of claim 7, wherein the capturing is in response to movement of a rear door handle.

11. The method of claim 7, wherein the capturing is in response to a signal transmitted from a keyfob.

12. The method of claim 7, wherein the front seat passenger data includes anthropometric characteristics of a front seat passenger.

13. The method of claim 7, wherein the front seat is a driver seat.

14. A vehicle comprising:
   a blind-spot optical sensor system; and
   at least one controller configured to, in response to a trigger signal, activate the blind-spot optical sensor system to capture data indicative of a size of an expected rear passenger before the expected rear passenger enters the vehicle, and move a steering wheel or accelerator pedal of the vehicle based on the size before the expected rear passenger enters the vehicle.

15. The system of claim 14, wherein the trigger signal is transmitted from a key fob.

16. The system of claim 14, wherein the trigger signal is generated in response to movement of a rear door handle.

17. The system of claim 14, wherein the data includes measurements based on average rear seat passenger anthropometric characteristics.

* * * * *